United States Patent [19]
Patel et al.

[11] Patent Number: 5,835,535
[45] Date of Patent: Nov. 10, 1998

[54] DATA BUS INTERFACE APPARATUS WHICH MEASURES VOLTAGE POTENTIAL ON THE UPLINK LINE OF THE DATA BUS AND REMOVES AN AC COMPONENT

[75] Inventors: Jayesh M. Patel, Roselle; Jeffrey W. Tripp, Grayslake; Bernard L. Knych, Mount Prospect, all of Ill.

[73] Assignee: Motorola, Inc., Schaumburg, Ill.

[21] Appl. No.: 855,158

[22] Filed: May 13, 1997

Related U.S. Application Data

[60] Continuation of Ser. No. 79,787, Jun. 23, 1993, abandoned, which is a division of Ser. No. 980,097, Nov. 23, 1992, abandoned.

[51] Int. Cl.$^6$ .................................................. H04B 3/00
[52] U.S. Cl. ......................... 375/257; 375/224; 375/295; 326/30; 326/86; 327/51; 327/108; 307/412
[58] Field of Search .................................. 375/219, 220, 375/257, 258, 295, 296, 297, 224; 330/1 R, 5, 252, 253; 370/248, 241, 276, 257, 254, 282; 326/21, 22, 30, 31, 33, 34, 62, 80, 82, 83, 86, 90; 327/51, 52, 56, 108, 111; 379/399, 403, 404, 401, 161

[56] References Cited

U.S. PATENT DOCUMENTS

| | | |
|---|---|---|
| 4,486,624 | 12/1984 | Puhl et al. . |
| 4,603,418 | 7/1986 | Townsend . |
| 4,654,655 | 3/1987 | Kowalski . |
| 4,680,787 | 7/1987 | Many . |
| 4,893,348 | 1/1990 | Andoh . |
| 4,941,126 | 7/1990 | Haubursin ................................ 364/900 |
| 4,972,432 | 11/1990 | Wilson et al. . |
| 5,119,365 | 6/1992 | Warner et al. ............................ 370/32 |
| 5,486,779 | 1/1996 | Eitrheim .................................... 327/51 |
| 5,654,653 | 8/1997 | Coyle et a l. ............................. 327/51 |
| 5,659,259 | 8/1997 | Bodenstab ................................ 327/51 |

*Primary Examiner*—Chi H. Pham
*Assistant Examiner*—William Luther
*Attorney, Agent, or Firm*—Daniel W. Juffernbruch; Richard K. Clark; Rolland R. Hackbart

[57] ABSTRACT

The data bus interface apparatus (243) which interfaces between one of a plurality of peripheral units (111) and a data bus (109). The data bus interface driver (243) is capable of biasing data to the voltage level of the data bus (109), accepting data signals (233) having different amplitudes and is immune to differences in ground voltage potentials caused by induced noise and differing environmental conditions. The data bus interface driver (243) is capable of data transition rates in excess of 1 MHz and has low EMI and RFI emissions.

3 Claims, 3 Drawing Sheets

DATA BUS INTERFACE APPARATUS WHICH MEASURES VOLTAGE POTENTIAL ON THE UPLINK LINE OF THE DATA BUS AND REMOVES AN AC COMPONENT

This is a continuation of application Ser. No. 08/079,787, filed Jun. 23, 1993 and now abandoned, which is a division of application Ser. No. 07/980,097, filed on Nov. 23, 1992 now abandoned.

FIELD OF THE INVENTION

Generally, this invention relates to data bus drivers and more specifically to a self-biasing data bus driver circuit for a high-speed, low-amplitude digital data bus contained within a radiotelephone.

BACKGROUND OF THE INVENTION

Currently, in the field of radiotelephones, there is one technique of transmitting voice and data between the transceiver and the handset of a radiotelephone. This technique includes two individual busses, the first bus containing data signals, and the second bus containing audio or voice signals. This allows for a relatively low speed data signal bus which does not have an electromagnetic interference (EMI) or radio frequency interference (RFI) problem.

Today and in the future, as microprocessor communications within microprocessor based systems becomes faster, the radiotelephone is capable of integrating digital audio signals and the data signals onto one bus. This one bus allows for new developments in radiotelephone technology for adding peripherals, for example answering machines, fax machines, and modems, onto the one bus without separating the voice signals from the data signals prior to sending them to the transceiver. This reduces the number of wires necessary for the interconnection between the peripheral and the transceiver and allows for a common interface technique. However, this data bus must be capable of high speed data transition rates with minimal RFI and EMI radiation and a high tolerance to interference from other subsystems surrounding the radiotelephone. An automobile environment is a prime example of where interference between other subsystems is a great concern because of the close proximity to other systems such as engine control modules and electronically controlled suspension systems.

One way in which to reduce the amount of RFI and EMI radiation is to reduce the amplitude of the signal level on the data bus from 5 volts peak to peak ($V_{pp}$) to 0.5 $V_{pp}$. This reduction in the amplitude significantly reduces the amount of radiation but also produces several problems: first, the system becomes extremely sensitive EMI and RFI interference and second, it becomes sensitive to differences in the voltage potentials of the peripheral ground references. Other complications in the design of a high speed data bus are the distance between the transceiver and the handset or other peripheral devices, the environmental differences between the transceiver and the peripheral devices, and the separate power supplies of the transceiver and the peripheral devices can be several feet long allowing and also have separate power supplies. First, the distance between the transceiver and the peripheral devices creates a need for the bus to extend this distance. This distance increases the opportunity for the bus to induce noise from other systems and for a change in the voltage potential of the ground. Second, the peripherals can be located in different environmental conditions, for example, the transceiver can be located in the trunk and the handset located inside the passenger compartment, the difference in temperature can severely effect the operation of some components and their voltage levels. Finally, the different power supplies for different devices increases the opportunity for deviations in the voltage potential of the ground. peripheral. Therefore, a need exists for a high speed digital data bus driver which transmits signals having an amplitude less than 0.5 volt and is immune to differences in environmental characteristics, power supplies, ground potential and signal levels.

SUMMARY OF THE INVENTION

The present invention is a data bus interface driver which interfaces between one of a plurality of peripheral units and a data bus. The data bus interface driver is capable of accepting data signals having different amplitudes and is immune to differences in ground voltage potentials caused by induced noise and differing environmental conditions. The data bus interface driver is capable of data transition rates in excess of 1 MHz and has low EMI and RFI emissions.

DESCRIPTION OF A PREFERRED EMBODIMENT

Figure 1:
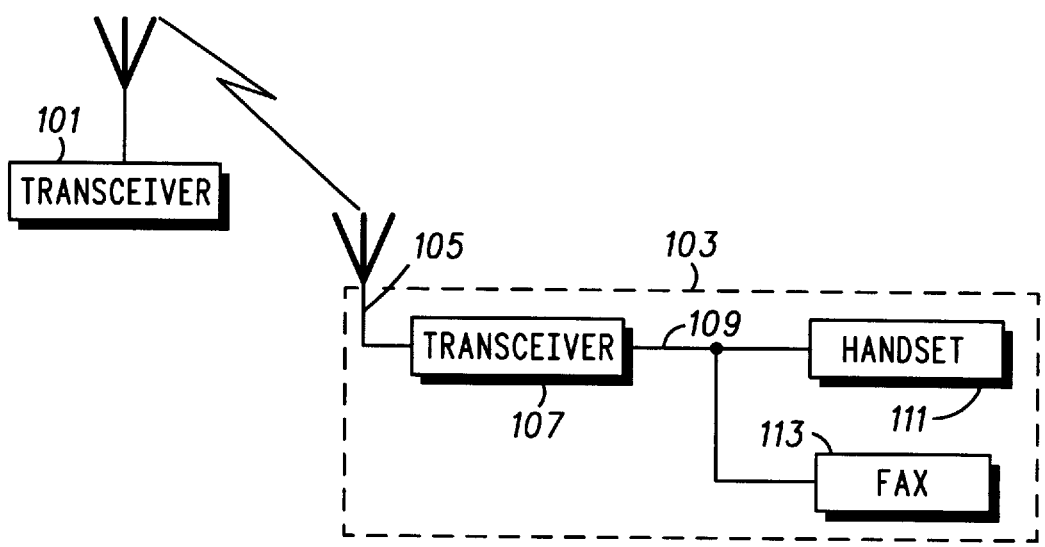
FIG. 1 is a block diagram of a radio frequency data communication system.

FIG. 1 is a radio frequency (RF) data communications system having a fixed site transceiver 101 and a mobile or portable transceiver 103. The mobile or portable transceiver 103 sends and receives RF signals from the fixed transceiver 101. The RF signals are coupled by the antenna 105 and are demodulated and transformed into data signals by the transceiver 107. The transceiver 107 can send or receive the data signals to peripherals on a serial digital data bus 109. The peripherals in this example are a handset 111 and a fax machine 113, but other peripherals should not be excluded.

Figure 2:
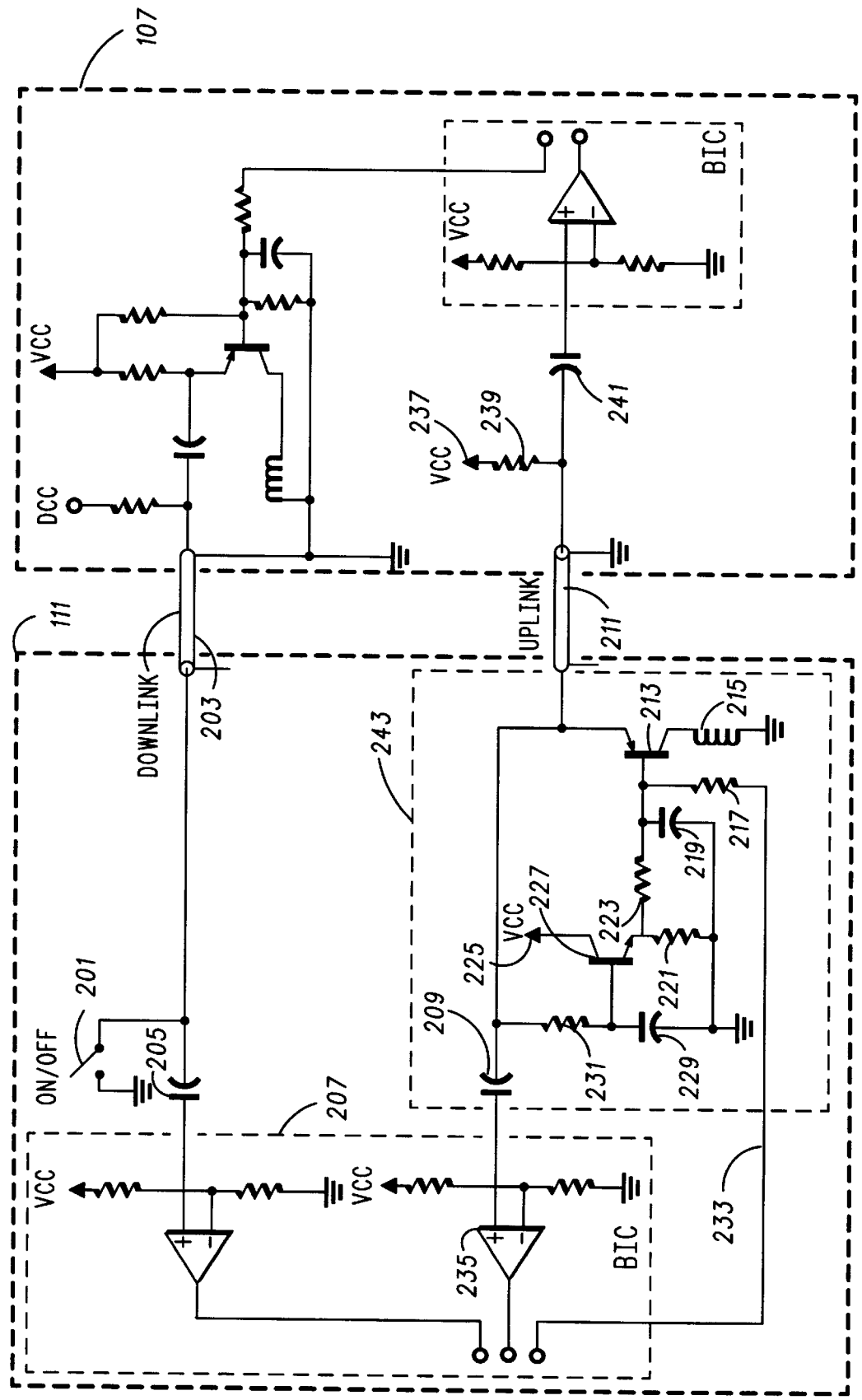
FIG. 2 is a schematic of a bus driver circuit which may employ the present invention.

FIG. 2 reveals an exploded view of the digital data bus between the transceiver 107 and the peripheral handset 111. Although only the transceiver 107 and the handset 111 are shown in FIG. 2, the data bus can be used in a multi-peripheral configuration. The digital data bus 109 is shown as uplink 211 and downlink 203. These links allow for data transmission between the handset 111 and the transceiver 107. The data bus driver circuit 243 is common to all of the peripheral devices and serves two main purposes. First, the data bus driver circuit 243 is used to create a single voltage bias level for the data bus uplink 211, eliminating the varying references points from each individual peripheral device on the data bus by feeding the DC voltage level of the data bus signal on the uplink 211 into the data bus drive circuit 243. Second, it divides the voltage level of the data signal output from the bus interface chip (BIC) 207 down to the amplitude of the data signals used on the data bus 109. For the present invention, the amplitude of the voltage out of the chip is 5 $V_{pp}$ and it is divided down to an amplitude of 0.5 $V_{pp}$, however, any other comparable voltage divider scheme may be employed here.

Since the data bus 109 uses small amplitude signals, the data bus 109 must be driven around the same reference point to insure proper priority control of the data bus 109. The priority scheme for attaining control of the data bus 109 is realized by the peripheral with the lowest Q2 base voltage potential forcing the base emitter junction of Q2 on all of the other peripherals to be reversed biased, therefore, preventing the other peripherals from driving the bus. The common bias point of all the peripherals is accomplished between with the feedback through the transistor Q1 227 and Q2 213. The circuit, including the resistor 231 and the capacitor 229 and the transistor Q1 227, removes the AC component of the data signal on the bus 211. At the emitter of Q1 the common bias voltage of the bus uplink 211 is present. This common bias voltage level is then used to bias Q2. As a result of this feedback operation, variances in components or ground levels or power supply potentials is eliminated with concern to this bus uplink 211 and also variances in the voltage signal levels of the data coming out of the bus interface chip 207.

The data signals output from the bus interface chip 207 on signal line 233 have an amplitude which varies from one peripheral device to another, in this example, the data signals output from the peripheral device has an amplitude between 0 to 5 volts. The resistor 217 and the resistor 223 provide a voltage divider network which reduces this amplitude down to a 0.5 $V_{pp}$ about the bias voltage present at the emitter of Q1 227. Resistor 221 and capacitor 219 form a filtering mechanism for removing noise from the line. The inductor 215 also contributes as a filtering mechanism.

Once the peripheral device obtains control of the bus by pulling 233 to its lower state and holding it for a specified amount of time, it turns on the transistor Q2 213 and the data is driven out the uplink 211 to the transceiver 107. The voltage supply of the peripheral 225 can be different than the power supply of the transceiver 237. Regardless of the differences, the data bus will still have a common bias voltage. The original bias level is generated by the transceiver power supply 237 and the resistor 239. The on/off switch 201, and the downlink 203 is switched on when a peripheral is first turned on. This grounds the downlink signifying to the transceiver 107 that a new peripheral device 111 has linked to the serial bus 109. The downlink is used to send a common clocking source from the transceiver 107 to all the peripheral devices. All the data signals driven out by a peripheral device 111 must have an effective duty cycle of approximately 50%. An effective duty cycle of 50% is defined as an average value of the data signal equal to ½ the voltage peak to peak. This allows the bias point to stabilize at the middle of the transition levels, allowing for proper recovery of the data by the transceiver. If the output signal line 233 remains in a high or low state for a significant length of time, then the DC bias level at the emitter of Q1 227 will eventually adjust to the voltage level at which the data is held, causing errors in the data transmission. This potential problem is solved by sending manchester encoded data which guarantees transitions in the data signal.

Figure 3:
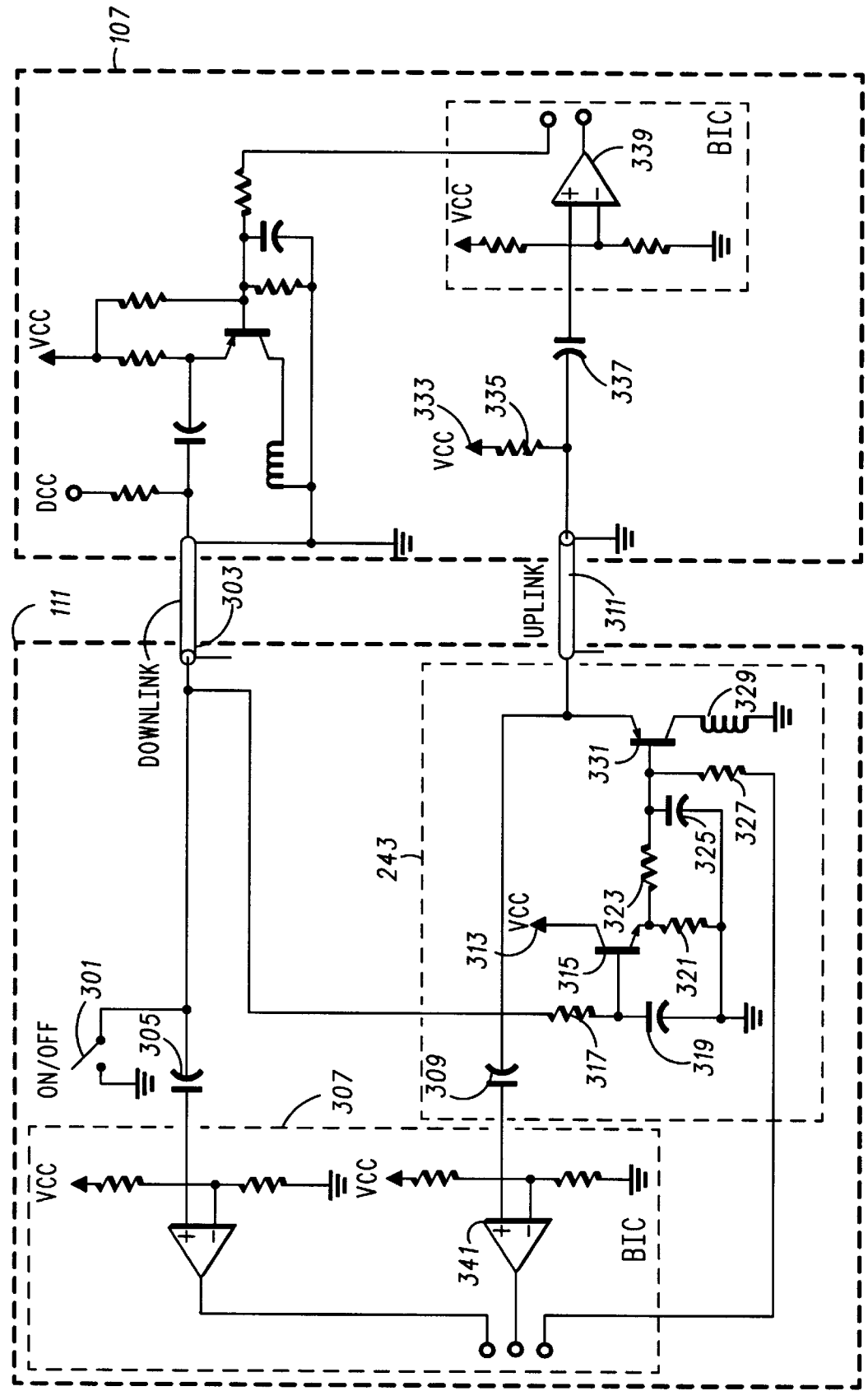
FIG. 3 is a schematic of an alternate bus driver circuit which may employ the present invention

FIG. 3 is alternative embodiment to FIG. 2. The only significant change in this embodiment is that the master or the transceiver 107 determines the bias level at the output of the emitter Q1 315 to determine the bias level by referencing the bias level off the downlink 303 which comes from the master transceiver 107. The rest of the circuit contained here is identical to FIG. 2.

There are two essential parts of this embodiment. First, the use of the DC voltage level of the data bus to bias the data signal output from the peripheral devices. This biasing eliminates the differences in environmental characteristics, power supplies, ground potential and signal levels of the individual peripheral devices from the data signals. Second, adjusting the amplitude of the signal output from the individual peripheral device to a common low amplitude signal. By adjusting this amplitude, there is a known voltage for prioritizing the bus access and lower EMI and RFI emissions.

What is claimed is:

1. A bus interface apparatus for an instant peripheral device among a plurality of peripheral devices for communication on a data bus, the bus interface apparatus comprising:

a driver amplifier having an output operatively coupled to an uplink line of the data bus for driving the data bus based on a data signal to be transmitted by the instant peripheral device via a voltage divider network and received at an input to the driver amplifier, the driver amplifier driving the uplink line of the data bus with reference to a common bias voltage;

a common bias amplifier having an output operatively coupled to the driver amplifier to generate the common bias voltage for the driver amplifier and having an input operatively coupled to the uplink line of the data bus for measuring a voltage potential on the uplink line of the data bus and for removing an AC component of an input signal from the uplink line in order to generate the common bias voltage for the driver amplifier; and wherein the driver amplifier via the uplink line disables communication on at least the uplink line by other of the plurality of peripheral devices on the data bus when the instant peripheral device has priority by altering a bias on amplifiers of the driver amplifiers of other of the plurality of peripheral devices.

2. A bus interface apparatus in accordance with claim 1, wherein the common bias amplifier comprises a resistor operatively coupled to the uplink line of the data bus and a capacitor operatively coupled to the resistor for deriving and holding a value of the common bias voltage.

3. A bus interface device according to claim 1, wherein the driver amplifier via the uplink line provides a voltage that forces transistor junctions of the driver amplifiers of other of the plurality of peripheral devices on the data bus to be reversed biased when the instant peripheral device has priority.

* * * * *